United States Patent
Foti

(10) Patent No.: US 9,529,981 B2
(45) Date of Patent: *Dec. 27, 2016

(54) METHODS AND SYSTEMS FOR SETTING ACCESS TO A LIST OF CLASS ENTITIES

(71) Applicant: The MathWorks, Inc., Natick, MA (US)

(72) Inventor: David A. Foti, Holliston, MA (US)

(73) Assignee: The MathWorks, Inc., Natick, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/510,696

(22) Filed: Oct. 9, 2014

(65) Prior Publication Data

US 2015/0026703 A1 Jan. 22, 2015

Related U.S. Application Data

(63) Continuation of application No. 13/155,918, filed on Jun. 8, 2011, now Pat. No. 8,875,161.

(51) Int. Cl.
*G06F 21/12* (2013.01)
*G06F 9/44* (2006.01)

(52) U.S. Cl.
CPC ............. *G06F 21/126* (2013.01); *G06F 8/315* (2013.01); *G06F 9/443* (2013.01)

(58) Field of Classification Search
None
See application file for complete search history.

(56) References Cited

U.S. PATENT DOCUMENTS

| | | | |
|---|---|---|---|
| 5,297,283 A | | 3/1994 | Kelly, Jr. et al. |
| 6,473,800 B1 * | | 10/2002 | Jerger ................ G06F 21/52 709/224 |
| 6,708,276 B1 * | | 3/2004 | Yarsa et al. ................. 726/6 |
| 7,426,721 B1 | | 9/2008 | Saulpaugh et al. |
| 2005/0050537 A1 | | 3/2005 | Thompson et al. |
| 2006/0117296 A1 | | 6/2006 | Gimness et al. |
| 2006/0265690 A1 | | 11/2006 | Motoyama et al. |
| 2007/0288892 A1 | | 12/2007 | Foti |
| 2008/0134310 A1 * | | 6/2008 | Borde et al. ................. 726/7 |
| 2008/0178198 A1 | | 7/2008 | Gauba |
| 2009/0183139 A1 * | | 7/2009 | Foti et al. ................ 717/107 |

(Continued)

OTHER PUBLICATIONS

Biczo, M. et al., "Runtime Access Control in C# 3.0 Using Extension Methods," Annales Univ. Sci. Budapest, Sect Comp., vol. 30:41-59 (2009).

(Continued)

*Primary Examiner* — Tuan Dao
(74) *Attorney, Agent, or Firm* — Nelson Mullins Riley & Scarborough LLP

(57) ABSTRACT

In an embodiment, a feature is an aspect of a class which represents information, data, behaviors, or capabilities encapsulated by the class. An accessing class may be given access to one or more specified features encapsulated by an accessed class, without gaining access to other features encapsulated by the accessed class. Accordingly, special access may be granted only to the behavior and data specifically designed for the accessing class, without allowing the accessing class access to all private data and behaviors of the accessed class, and without allowing all classes in a package access to the accessed class.

13 Claims, 7 Drawing Sheets

(56) References Cited

U.S. PATENT DOCUMENTS

2011/0041141 A1* 2/2011 Harm ............... G06F 9/541
                                                              719/318
2011/0066655 A1   3/2011 Nama et al.
2012/0317589 A1  12/2012 Foti

OTHER PUBLICATIONS

MathWorks, "Learning Matlab7," Matlab & Simulink Student Version, Release 14, 336 pages, (2005).
Meyer, Bertrand, "An Eiffel Tutorial," Interactive Software Engineering, ISE Technical Report TR-EI-66/TU, 100 pages, (2001).
International Preliminary Report on Patentability for Application No. PCT/US2012/041286, 22 pages, dated Sep. 17, 2013.
International Search Report and Written Opinion for Application No. PCT/US2012/041286, 16 pages, dated Aug. 14, 2012.
Written Opinion for Application No. PCT/US2012/041286, 12 pages, dated May 15, 2013.
Odersky, M., et al., "Sealed classes," Programming in Scala, Chapter 15, section 15.5, Artima Press, Mountain View, California, XP055248725, ISBN: 978-0-9815316-1-8, pp. 310-312 (2008).
Summons to Attend Oral Proceedings, European Application No. 12727554.3, dated Mar. 14, 2016, 12 pages.

* cited by examiner

Fig. 2A

```
202   204        206        200
 ↓     ↓          ↓          ↓
classdef(Subclasses={?B, ?C, ?D}) A
end
```

Fig. 2B

```
210
 ↓
classdef C
    properties
         ↓ 212
         A
         B
    end
    properties(Access = private)   218
                  ↓ 214              ↑
                  pA
                  pB
    end
    properties(Access = ?D)        222
                  ↓ 216              ↑
                  X              220
                  Y
    end
end
```

Fig. 2C

```
230
 ↓
classdef C
    methods
                    232
                     ↓
         function foo(obj);
         function y = bar(obj, x);
    end
    methods(Access = {?D, ?E})  238
              ↓ 236                ↑
         function update(obj)
                              234
    end
end
```

Fig. 2D

```
240
 ↓
classdef C
    events(NotifyAccess = private, ListenAccess = ?D, @specialFunc)
              ↓ 244                        ↑ 246      ↑ 248    ↑ 250
         Added
         Removed
          ↑ 242
    end
end
```

METHODS AND SYSTEMS FOR SETTING ACCESS TO A LIST OF CLASS ENTITIES

RELATED APPLICATIONS

This application is a continuation of U.S. application Ser. No. 13/155,918, filed on Jun. 8, 2011, now U.S. Pat. No. 8,875,161, issued on Oct. 28, 2014, the contents of which are incorporated by reference herein.

BRIEF DESCRIPTION OF THE FIGURES

The accompanying drawings, which are incorporated in and constitute a part of this specification, illustrate one or more embodiments described herein and, together with the description, explain these embodiments. In the drawings:

FIG. 2A depicts an example of creating a sealed family of subclasses according to one or more embodiments described herein;

FIG. 2B depicts an example of creating a set of properties that may be accessible to a particular class according to one or more embodiments described herein;

FIG. 2C depicts an example of creating a set of class functions that may be accessible to particular classes according to one or more embodiments described herein;

FIG. 2D depicts an example of creating and providing limited access to events according to one or more embodiments described herein;

DETAILED DESCRIPTION

Figure 1:
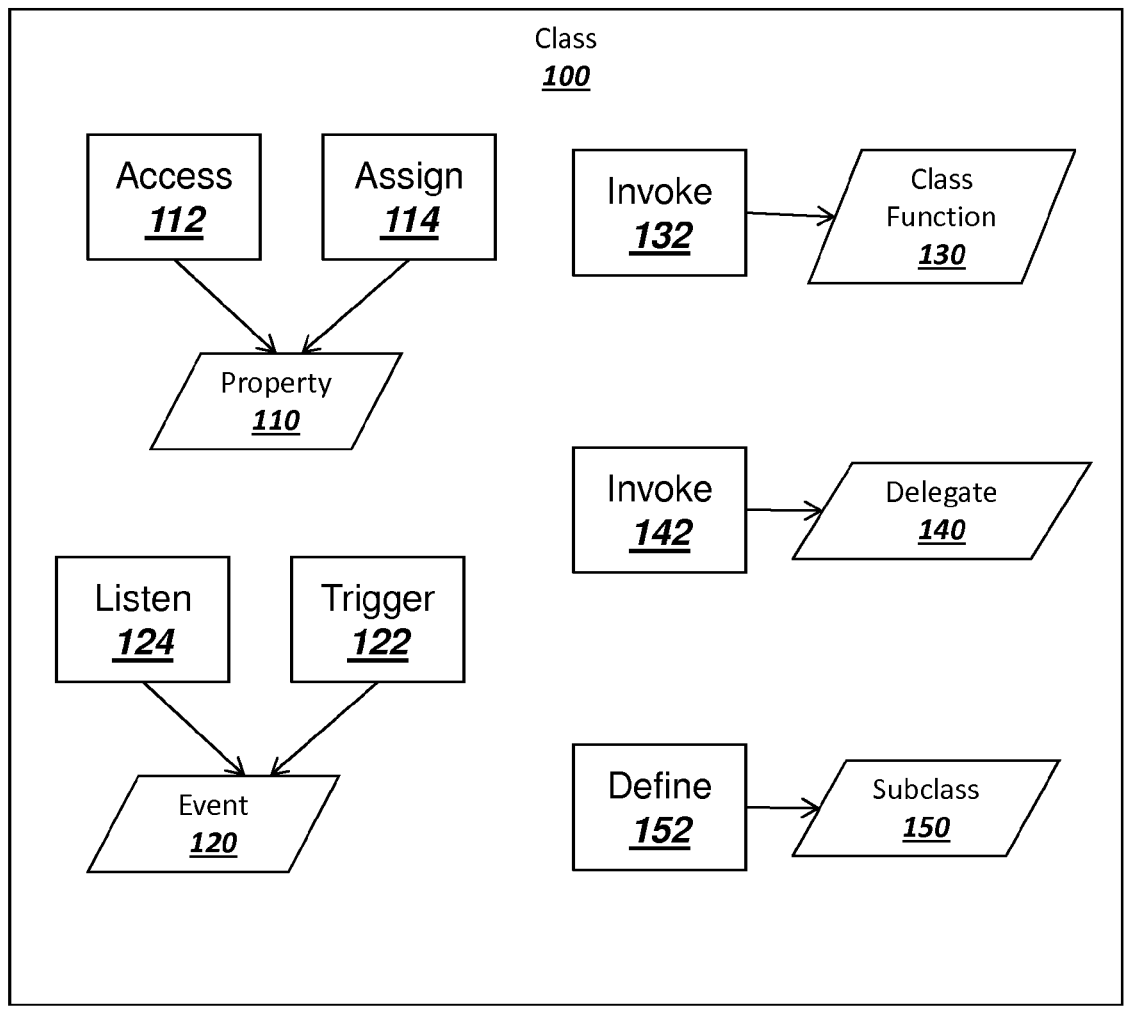
FIG. 1 depicts examples of class features which may be accessed by an accessing class.

An embodiment may include a non-transitory electronic-device readable storage medium that may store instructions that, when executed by one or more processing devices, may cause the one or more processing devices to accept a specification of one or more features of an accessed class which may be an object-oriented class (e.g., a class that is written in an object-oriented language). The accessed class may have one or more specified features and one or more non-specified features. One or more features of the accessed class may be accessed by accessing functions or accessed by methods of an accessing class, which may also be an object-oriented class.

The medium may further store instructions that may cause the processing devices to accept a specification for one or more class features that includes a specification of what entities may access that particular feature or features. In an alternative embodiment, the specification may instead contain information identifying which entities are excluded from access to that particular feature or features.

The specification may include a set or list of entities. An entity may be a class, a method of a class, a function, a script, a program, a component, a package, an assembly, or any other unit of a program or application. An entity may be specified by name, by identifier, by objects that represent the entity, or by expressions that evaluate to strings or objects that represent the entity. The set or list of entities may include one type of entity, any combination of entities, or be an empty set or list. The specification may indicate that certain entities may access the one or more specified features of the accessed class. Non-specified entities may be restricted from accessing the one or more specified features of the accessed class. Entities granted access to one or more features of an accessed class may not be granted access to other features of the same accessed class.

The specification of the features of the accessed class may be provided as part of a class definition for the accessed class. Access rights to the specified features and non-specified features may be enforced, for example, at compile time and/or at run time. For example, a compiler, while compiling an accessing function or other entity, may consult compiled meta-data for the accessed class and determine whether to compile code to access the accessed class or generate an error. The compiler could be an ahead-of-time compiler or a just-in-time compiler. Alternatively, an interpreter could consult the specification of the accessed class while interpreting access to features of the class and may grant access or throw an error.

Features identified in the specification of the accessed class may include one or more of a property of the accessed class, accessing a value of a property of the accessed class, assigning a value of a property of the accessed class, a class function of the accessed class, an event that may be triggered by the accessed class, triggering an event defined by the accessed class, listening to an event defined by the accessed class, invoking a delegate defined by the accessed class, and defining a subclass of the accessed class.

For example, the specification of the one or more accessing classes may identify a class function of the accessing class. In this case, allowing the specified accessing class to access the one or more specified features may include providing the access to the specified class function of the specified class. Access to non-specified class functions of the specified class may be restricted.

Where an accessing class is granted access to a feature or features, the accessing class may include or be associated with one or more subclasses, and the one or more subclasses may be allowed access to the one or more specified features.

In another embodiment, the instructions may include instructions to process a class definition for an accessed class. The class definition may include a declaration or definition of a feature of the accessed class and a list of one or more classes which are permitted to access the declared or defined feature. An access policy defined at least in part by the list may be enforced by identifying that an entity described by a class is attempting to access the feature of the accessed class, consulting the list to determine whether the class is permitted to access the feature, and permitting the entity to access the feature when the entity is permitted to access the feature.

Further embodiments may include electronic-device implemented methods and/or systems for enforcing access rights of an accessing class and/or restricting non-specified entities from accessing features of an accessed class.

An object-oriented class may encapsulate information and/or capabilities of the class. The class may provide access to the encapsulated information and/or capabilities to other classes. However, in some situations, it may not be desirable to provide access to the class's encapsulated information and capabilities.

Accordingly, an object-oriented language may limit access to encapsulated information and/or capabilities to particular entities. For example, the object-oriented language may contain provisions that allow a class to be declared as private so that only the class itself can access internal information and/or capabilities. Moreover, the language may contain provisions that restrict access to information and/or capabilities of the class to the class, subclasses of the class, and/or to "helper" or "friend" classes of the class. In addition, the language may contain provisions to enable any code to access the capabilities and/or information of the class (i.e., access to the capabilities and/or information may be unrestricted).

If an accessing class is given access to capabilities and/or information of an accessed class using, for example, the "friend" technique described above, the accessing class gains access to all of the capabilities and/or information of the accessed class. This may lead to unintended behaviors. For example, an accessed class may be designed to allow an accessing class to modify a property, but by providing access to the specific property in question, the accessed class may also allow the accessing class to modify other properties or invoke functions which the programmer did not intend to be accessed by the accessing class.

Encapsulation of class features allows features to be changed with very limited and isolated impact on a system of classes and programs. For example, if a class feature is private to a class, the class author can readily change or remove that class feature without changing other parts of systems using that class. If a class feature is publicly accessible, then the class author may not be able to change that feature without having significant impact on systems using the class and the class author may have difficulty finding all of the parts of the system that are affected by the change. If a class feature is accessible only to the defining class and a specific set of entities outside the class, then a class author knows what parts of a larger system may be impacted by any change to that class feature.

In exemplary embodiments described herein, mediums, methods, and systems are provided for enforcing access rights for specified features of an accessed class without granting rights to unspecified features of the accessed class. A feature of an accessed class may include information, data, behaviors, and/or capabilities encapsulated by the class. A specified feature may be a feature which is specified for special treatment in some way in a specification. The specification may be, for example, a specification of the accessed class, such as a class definition of the accessed class. An unspecified feature may include a feature of the accessed class which is not explicitly or implicitly specified for special treatment in the specification. The special treatment may involve providing limited access to specified features of the accessed class.

Accordingly, limited access may be granted for a feature of an accessed class that may be specifically designed for an accessing class, without allowing the accessing class access to certain private data and behaviors of the accessed class, and without allowing other classes, for example in a package, access to the accessed class.

Techniques described herein may be incorporated in, for example, a programming language, a compiler, and/or execution engine associated with a programming language. For example, a programming language may provide support for providing limited access to an accessing class, and an associated compiler and/or execution engine may enforce restrictions described in source code written in the programming language. Such functionality may also be provided, for example, by a source code editor.

A number of features in an accessed class may be accessed by an accessing class. For example, FIG. 1 depicts exemplary features of an accessed class 100 which may be accessed by an accessing class. In FIG. 1, two types of features are depicted. Features depicted in rectangles generally relate to actions which may be performed on class entities, or rights which are granted with respect to entities. The class entities are depicted using parallelograms. In the description provided herein, both class entities and actions/rights are referred to as features.

An exemplary feature of class 100 is a property 110. A property 110 of class 100 may include, for example, information, data, or variables associated with or encapsulated by class 100. A value may be associated with a property 110.

Although a property 110 may, by itself, be considered a feature of class 100, there may also be features associated with the property 110 which may be individually accessed by an accessing class. For example, an accessing class may be given only the limited capability to access 112 the property 110. This may include, for example, reading the value of the property 110. An accessing class may also be given the ability to assign 114 a value to the property 110. Granting access to the property 110 as a feature may grant access to all actions that may be performed on the property 110, including the ability to access 112 and assign 114 values to the property 110.

Another exemplary feature of class 100 may be an event 120 associated with the class 100. An event 120 may be an action which may permit the class 100 to take an action in response to the occurrence of the event 120. An event 120 may be triggered by the occurrence of the action; an ability to trigger 122 an event 120 is another feature of a class 100. For example, if a user depresses a mouse button, a mouse_button_down event may occur. In order to determine whether the event 120 has occurred, class 100 may listen 124 for the event. Listening for the event 120 may be accomplished, for example, by attaching a construct known as a listener to an event 120.

A class function 130 may also be an exemplary feature of the class 100. A class function 130 may include subroutines, procedures, methods, class functions, and instructions which may represent a particular task. Invoking 132 a class function 130 may cause the task to be carried out. The ability to invoke 132 the function 130 may be provided as a feature of class 100.

A delegate 140 may be a type that defines a class function signature. A delegate 140 may allow a programmer to pass a function as a parameter. When a delegate 140 is instantiated, the instance of the delegate 140 may be associated with a function or a method called on particular object. The function or method may be invoked through the delegate 140 instance. The ability to invoke 142 a delegate 140 may be a further feature of class 100.

The ability to define 152 subclass 150 may also be provided as a feature of class 100. Subclass 150 is a class which declares another class 100 as the subclass' parent (or superclass). The subclass 150 is derived from class 100 (which may be considered the "parent class" of the subclass) and may inherit some or all of the data properties and/or functionality of class 100.

The features specified in FIG. 1 are examples of features that an accessing class may attempt to access from an accessed class and the depiction is not intended to be exhaustive. Other features may be included and may depend on specifics of a programming language which defines the accessing class and/or the accessed class.

According to exemplary embodiments, one or more features of an accessed class may be specified, for example in source code written in a programming language. In addition, one or more accessing classes may be specified. The specified accessing classes may be granted access to the specified features of the accessed class without being granted access to other, non-specified features of the accessed class. FIGS. 2A-2D describe several examples of an accessed class, which provides access to features of the accessed class.

FIG. 2A depicts an example of creating a sealed family of subclasses using an object-oriented programming language. An accessed class "A" 200 may be defined in a class definition 202. The class definition 202 may specify a feature 204, such as the ability of an accessing class to declare itself as a subclass of the accessed class 200. In the example depicted in FIG. 2A, three accessing classes 206 ("B," "C," and "D") are permitted to declare themselves as subclasses of the accessed class 200. If, for example, a programmer were to attempt to access the feature 204 of the accessed class 200 by declaring class C as a subclass of class A, such an action would be allowed because class C has been granted special access rights to the subclassing feature 204 in the class definition 202 of class A.

If, on the other hand, a different accessing class E were to attempt to access the subclassing feature 204 of class A, class E would be prevented from doing so. For example, source code may be provided which includes a class definition for class E. In the source code, class E may attempt to declare itself as a subclass of class A. However, when the source code containing the attempt to subclass class E is compiled, the compiler may issue an error because class E has not been given access to the subclassing feature 204 of class A. Alternatively, the compiler may proceed to create an executable, but when the executable is run, an error may be generated.

Creating a sealed family of subclasses, as in FIG. 2A, may permit use of class hierarchy design without opening up the system to unexpected subclasses defined by outside programmers.

FIG. 2B depicts an example of creating a set of properties that are accessible only to a particular class. In the definition 210 of class C, a number of properties 212, 214, 216 are declared. The properties 212 are not specified to have special access restrictions, and are therefore considered to be non-specified features of the class C. In contrast, the properties 214 (pA and pB) are specified 218 to be restricted to private access. This means that access to the specified properties 214 is limited to class C. In other words, class C is both the accessed class and the (only permitted) accessing class in this example.

Further, accessing class D 222 is specified to have access 220 to the properties 216 (X and Y). In this example, class D 222 is the accessing class, and access 220 to the properties 216 (X and Y) is the specified feature of class C. Because C is the declaring class, C is also entitled to access the properties 216.

FIG. 2C depicts an example of creating a set of class functions that are accessible only to particular classes. In the definition 230 of class C, several non-specified class functions 232 are provided. Any accessing class may accordingly access the non-specified class functions 232. However, the function "update" 234 is specified as being accessible 236 by the accessing classes 238 D and E. Therefore, only classes C, D, and E may access the specified function 234.

FIG. 2D depicts an example of creating and providing limited access to events. In the definition 240 of class C, two events 242 (Added and Removed) are provided. The feature of being notified of the events 242 is specified as being private 244 to class C. However, the feature 246 of attaching listeners to the events 242 is granted to an accessing class 248 (class D).

As shown in FIG. 2D, access may be provided based on additional parameters other than class identification. For example, the ability to attach listeners to the events 242 is also granted to a function named "specialFunc." Accordingly, a class containing the function specialFunc may be given access to the feature of attaching listeners to the events 242, so long as the access request comes through the function specialFunc. In some embodiments, a symbol, such as a "?", may be used to designate accessing classes, while another symbol, such as "@" sign, may be used to designate accessing functions.

It is also possible to combine class access rights and function access rights so that, for example, only a particular function of a particular accessing class may be granted access to a feature of an accessed class. The remainder of the accessing class may be restricted from accessing the feature. For example, specifying "@D.specialFunc" instead of "@specialFunc" limits access to a feature of an accessed class to a function named "specialFunc" in class D. If another function of class D, such as "nonspecialFunc", attempts to access the feature, the attempt to access the feature may be denied because this function has not been granted permission to access the feature. Similarly, if a class other than class D attempts to access the feature (e.g., "E.specFunc"), the attempt may be denied.

Features may be specified and access to the features may be enforced in a number of ways. For example, FIG. 3 is a flowchart describing acts that may be used for specifying features, specifying accessing classes, and enforcing access rights.

Figure 3:
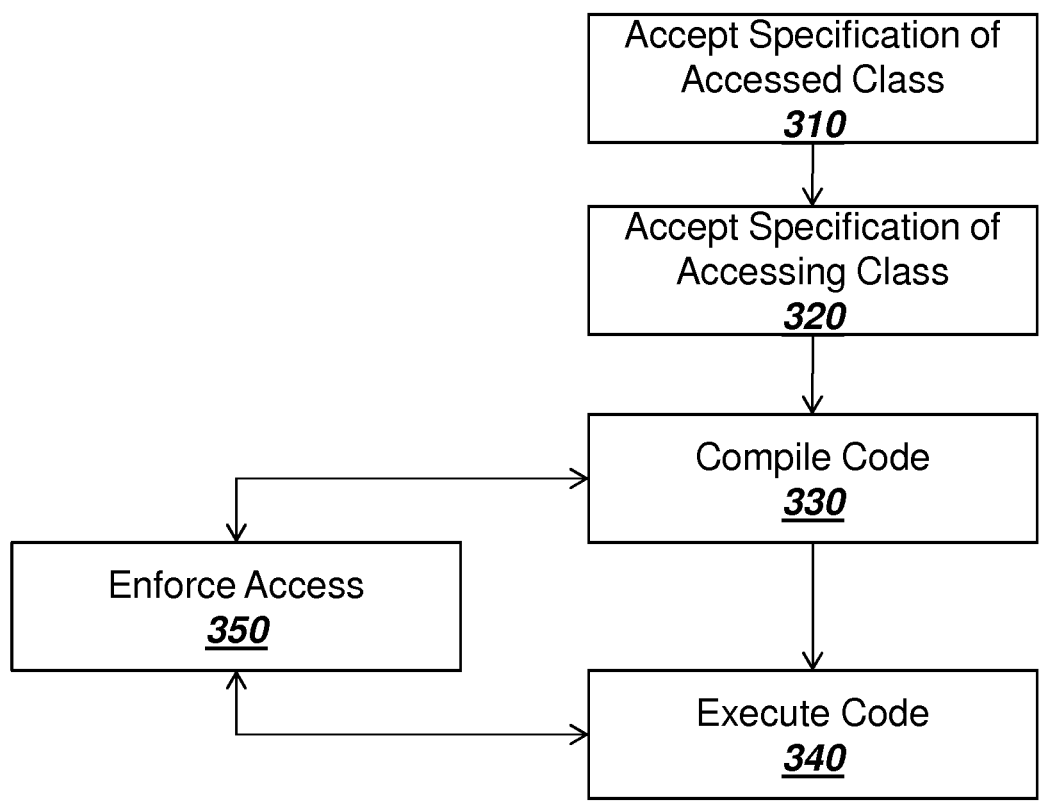
FIG. 3 illustrates a flowchart of acts that may be used to perform one or more embodiments described herein.

Referring to FIG. 3, at block 310, a system may accept a specification of an accessed class. The specification may designate that the accessed class has one or more specified features and one or more non-specified features. The specification may be, for example, a class definition. The specification may be written in source code or another type of high-level programming language, or may alternatively be provided in a low-level programming language.

At block 320, the system may accept a specification of an accessing class that accesses a feature specified for the accessed class at block 310. The specification of the accessing class and the specification of the features may be provided in a single document, such as a class specification or definition. The specified accessing classes may have one or more subclasses. In this case, the subclasses may be allowed to access the one or more specified features of the accessed class.

At blocks 310 and 320, the system may record information about which specific entities have been given permission to access specific class features. This information may be recorded in, for example, metadata that may be associated with the specification for the accessed and/or accessing class or an intermediate representation that may be generated from the classes. In another example, the system may create a list which details which entities have been given access to class features.

The system may compare entities that attempt to use the specific class features of the class to the information recorded when the class definitions were processed and grant or deny access accordingly. For example, the system may examine the above-mentioned list to determine whether an entity is permitted to access specified class features. This capability may be built into a compiler or execution engine.

At block 330, the code containing the specification of the features and/or the accessing class may be compiled to generate executable code, and at block 340 the executable code may be executed on a target system. Compilation and execution will be discussed in more detail with respect to FIG. 5, below.

Figure 4:
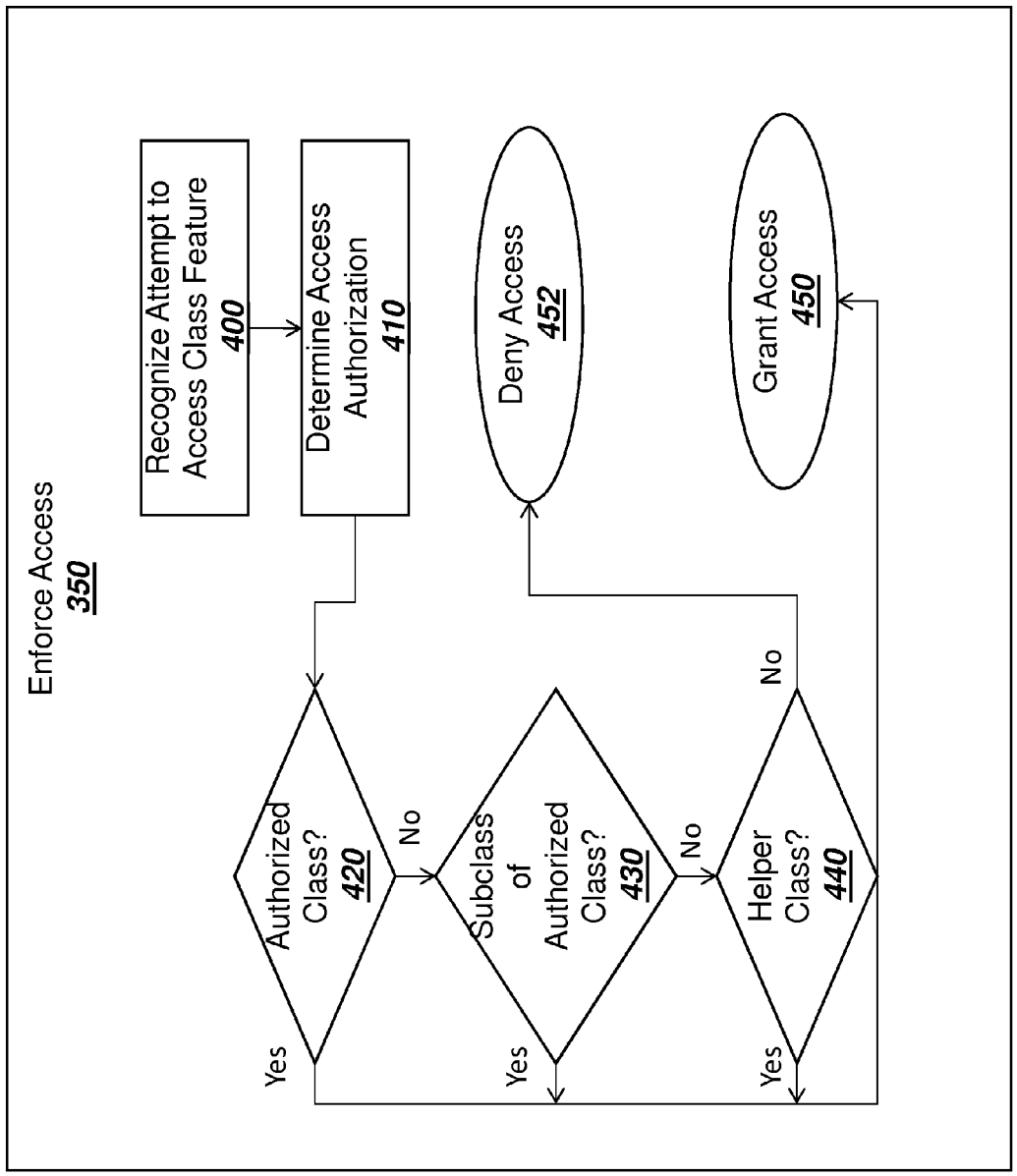
FIG. 4 illustrates a flowchart providing further detail of acts that may be performed at block 350 in FIG. 3.

At block 350, the system may enforce access to the specified features. As shown in FIG. 3, access enforcement may be performed during code compilation 330 or during code execution 340, or both. FIG. 4 describes acts that may be performed at block 350 of FIG. 3.

At block 400, the system may recognize an attempt to access a feature of an accessed class. The system may recognize the attempt during compilation, when an accessing class calls a function of the accessed class, attaches a listener to an event of the accessed class, or takes some other action with respect to a feature of the accessed class. Depending on whether the system enforces access rights during compilation or execution, block 400 may be performed by a compiler or an execution engine (or both).

In an embodiment, the system may generate a flag, metadata, or an identifier in response to accepting the specification of the features of the accessed class at block 310. At block 400, the flag, metadata, or identifier may be checked to determine whether a feature requested by the accessing class has been designated for special treatment.

At block 410, the system may determine whether the accessing class is authorized to access the class feature. At block 420, the system may check whether the accessing class has been designated as an authorized accessing class in the specification described at block 320. If the answer at block 420 is "yes," at block 450 access to the specified feature may be granted.

If the answer at block 420 is "no," at block 430 the system may check whether the accessing class is a subclass of an authorized accessing class which has been granted access at block 320. If the answer at block 430 is "yes," at block 450 access to the specified feature may be granted.

If the answer at block 430 is "no," at block 440 a check may be performed to determine whether the accessing class is a helper class of the accessed class. If the answer at block 440 is "yes," at block 450 access to the specified feature may be granted.

If the answer at block 440 is "no," at block 452 the attempt to access the class feature may be denied. For example, if block 350 is performed by a compiler, the compiler may generate an error condition and cease compilation. Alternatively, the compiler may merely generate a warning and continue compilation. If block 350 is performed by an execution engine during execution of compiled code, then the execution engine may stop execution of the code and generate an error condition. In an embodiment, a user may be presented with a prompt asking the user whether they wish to allow the accessing class to access the specified feature.

In addition or in the alternative, the specification may describe which classes are not permitted to access the specified features. Here, an accessing class, described in the specification, which attempts to access the specified features may be prevented from accessing the features. Note that other classes may be permitted to access the specified features.

Figure 5:
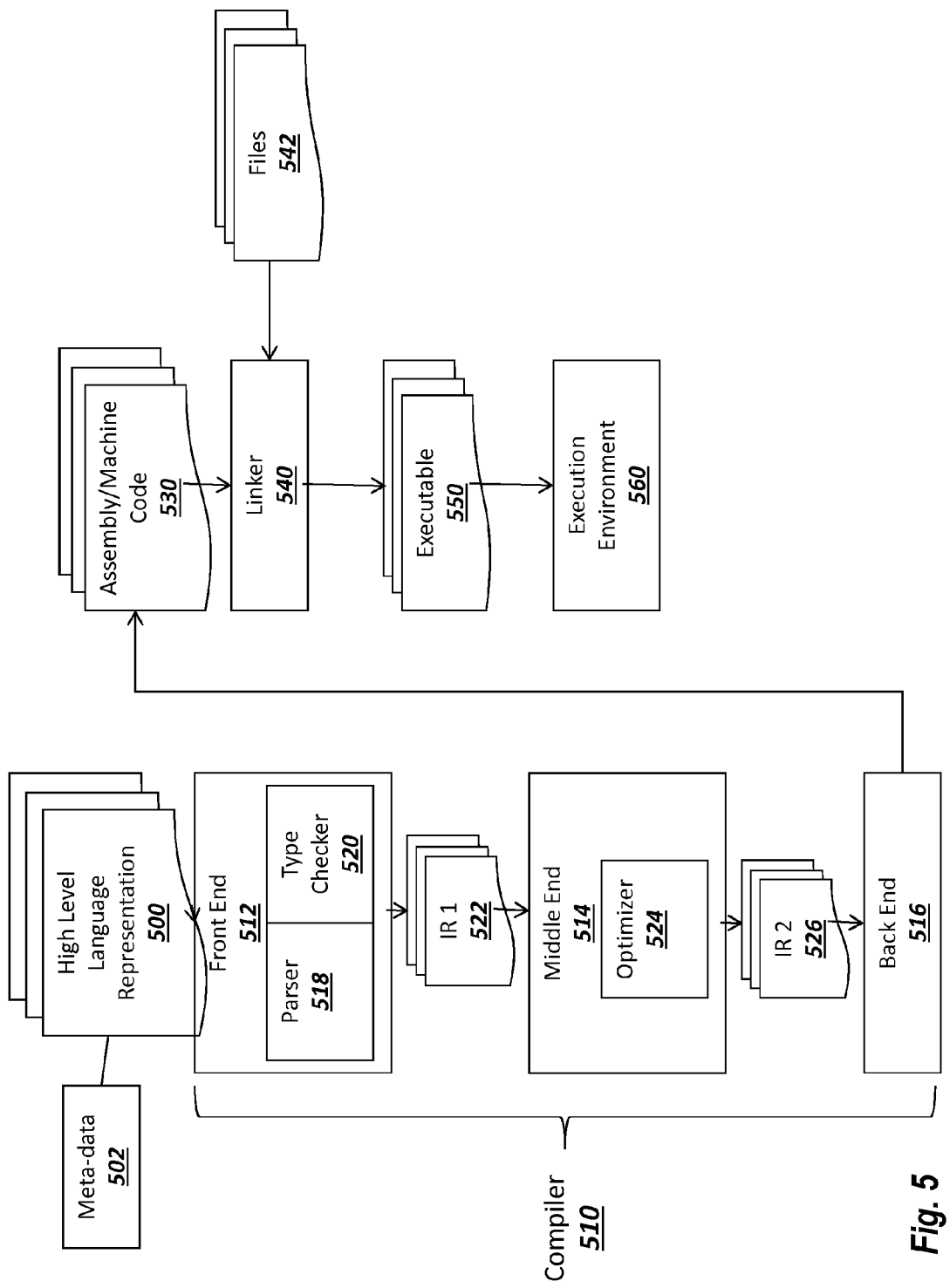
FIG. 5 depicts examples of components that may be used with one or more embodiments described herein.

As noted above, block 350 may be performed, for example, by a compiler and/or an execution engine. FIG. 5 depicts an example of compilation and execution.

A high-level language representation 500 may be provided. The high-level language representation 500 may represent, for example, source code written in a high-level programming language. High-level programming languages may include, for example, Java, C#, C++, .NET of the Microsoft Corporation of Redmond, Wash., and MATLAB of the MathWorks, Inc. of Natick, Mass. The high-level language representation 500 may be written in an object-oriented programming language. The high-level language representation 500 may include a specification of one or more features of an accessed class, and one or more accessing classes to be granted access to the specified features.

The high-level language representation 500 may be associated with meta-data 502, which describes entities that have been given permission to access the specified class features.

The high-level language representation 500 may be passed to a compiler 510. The compiler 510 may parse, analyze, and/or otherwise manipulate the high-level language representation 500 and transform the high-level language representation into assembly language or machine code 530. The compiler 510 may perform a number of functions, such as lexical analysis, preprocessing, parsing, semantic analysis, code generation, and code optimization.

The compiler 510 may include multiple components, such as a front end 512, a middle end 514, and a back end 516. The front end 512 may examine the high level language representation 500 for syntactical and semantic correctness, based on the programming language for which the high level language representation 500 is written. For example, the front end 512 may include a parser 518 for performing syntactic analysis and a type checker 520 for determining whether objects of various types are operating and interacting appropriately.

The front end 512 may generate a first intermediate representation (IR1) 522 for use by the middle end 514. IR1 522 may be an unoptimized representation of the original high level language representation suitable for processing by the middle end 514. The middle end 514 may receive the first intermediate representation 522 and apply one or more optimizations using an optimizer 524. For example, the optimizer may apply general code optimizations or target-system-specific optimizations. After optimizing the code, the middle end 514 may generate a second intermediate representation (IR2) 526 for processing by the back end 516.

The back end 516 may take the optimized second intermediate representation 526 and transform the second intermediate representation 526 into assembly language or machine code 530. The assembly language or machine code 530 may be processed by a linker 540, which links the assembly language or machine code with additional files 542 to form executable code 550.

The executable code 550 may be stored as an executable image (e.g., a .exe file) for future execution, or may be executed immediately in an execution environment 560. The execution environment 560 may execute the code 550 in order to cause a processor to take one or more actions or perform one or more tasks as defined by the code 550. The execution environment 560 may be an operating system, such as Microsoft Windows, or a technical execution environment such as MATLAB of the MathWorks, Inc or Java Virtual Machine.

Class access may be enforced in a model in block diagramming environment, such as Simulink of the MathWorks, Inc. Here, an accessed class may be used within a block diagram model provided in a modeling environment. The block diagram model may represent a system and may include one or more elements. The elements may include (1) one or more blocks that represent various portions of the system and (2) one or more signals that are associated with information transferred between the blocks. The blocks may implement functionality associated with portions of the system they represent. The signals may be represented in the block diagram model as lines that may extend between the blocks.

The block diagramming environment may accept a specification of an accessing element of the modeling environment to be granted access to the one or more features of the object-oriented class. The specified accessing element may be, for example, a block of the block diagram model, a signal in the block diagram model, or another block diagram model present in the modeling environment. The specification may be, for example, written into source code in a source model language, such as the source model language used by Simulink of the MathWorks, Inc.

The specified accessing element may be allowed to access the one or more specified features of an accessed class based on the permissions granted in the specification. The specified accessing element may be restricted from accessing one or more non-specified features of the accessed class. The specified accessing element may also be represented in the source model language, and may be represented as an object in the source model language.

Figure 6:
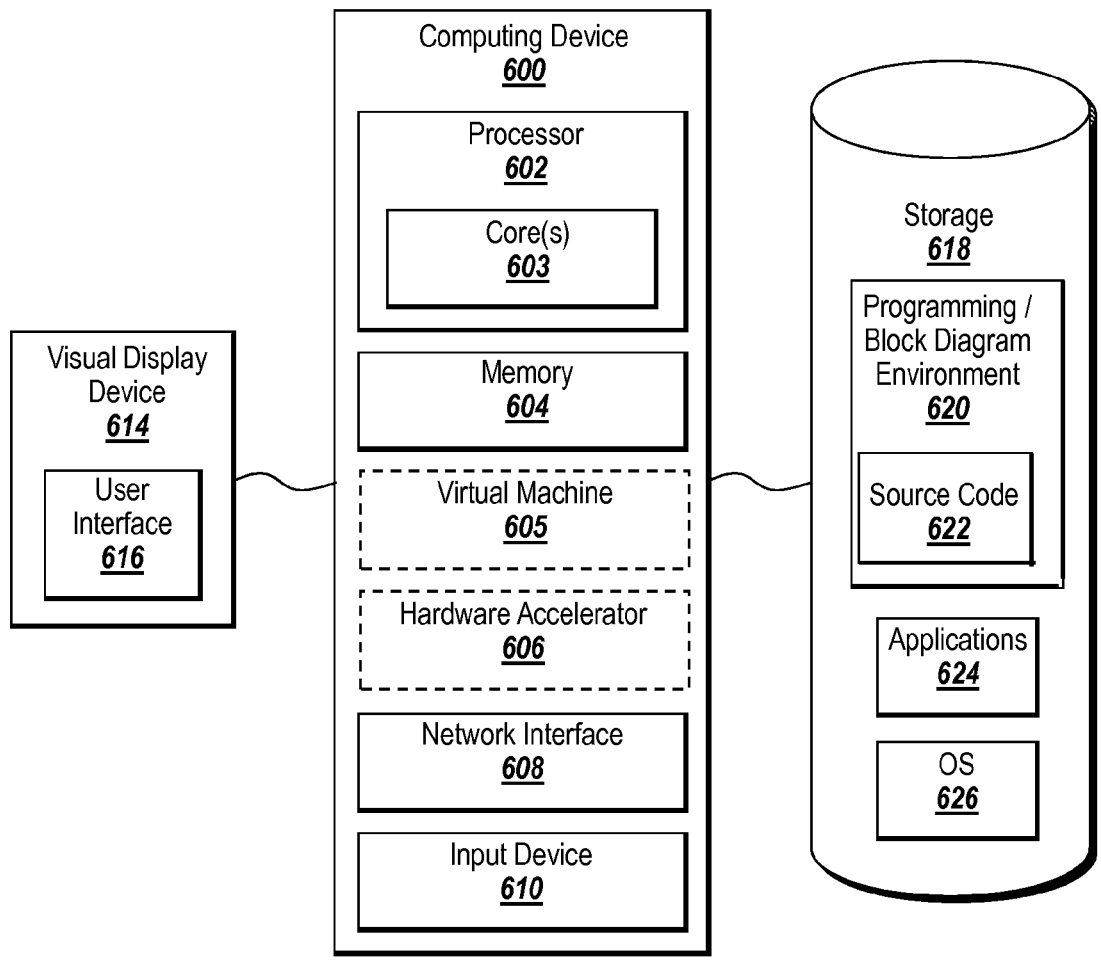
FIG. 6 illustrates an example of an electronic device that may be used with one or more embodiments described herein.

One or more of the above-described acts may be encoded as computer-executable instructions executable by processing logic. The computer-executable instructions may be stored on one or more non-transitory computer readable media. One or more of the above described acts may be performed in a suitably-programmed electronic device. FIG. 6 depicts an example of an electronic device 600 that may be suitable for use with one or more acts disclosed herein.

The electronic device 600 may take many forms, including but not limited to a computer, workstation, server, network computer, quantum computer, optical computer, Internet appliance, mobile device, a pager, a tablet computer, a smart sensor, application specific processing device, etc.

The electronic device 600 is illustrative and may take other forms. For example, an alternative implementation of the electronic device 600 may have fewer components, more components, or components that are in a configuration that differs from the configuration of FIG. 6. The components of FIG. 6 and/or other figures described herein may be implemented using hardware based logic, software based logic and/or logic that is a combination of hardware and software based logic (e.g., hybrid logic); therefore, components illustrated in FIG. 6 and/or other figures are not limited to a specific type of logic.

The processor 602 may include hardware or software based logic to execute instructions on behalf of the electronic device 600. The processor 602 may include logic that may interpret, execute, and/or otherwise process information contained in, for example, the memory 604. The information may include computer-executable instructions and/or data that may implement one or more embodiments of the invention. The processor 602 may comprise a variety of heterogeneous hardware. The hardware may include, for example, some combination of one or more processors, microprocessors, field programmable gate arrays (FPGAs), application specific instruction set processors (ASIPs), application specific integrated circuits (ASICs), complex programmable logic devices (CPLDs), graphics processing units (GPUs), or other types of processing logic that may interpret, execute, manipulate, and/or otherwise process the information. The processor may include a single core or multiple cores 603. Moreover, the processor 602 may include a system-on-chip (SoC) or system-in-package (SiP). An example of a processor 602 is the Intel® Xeon® processor available from Intel Corporation, Santa Clara, Calif.

The electronic device 600 may include one or more tangible non-transitory computer-readable storage media for storing one or more computer-executable instructions or software that may implement one or more embodiments of the invention. The non-transitory computer-readable storage media may be, for example, the memory 604 or the storage 618. The memory 604 may comprise a RAM that may include RAM devices that may store the information. The RAM devices may be volatile or non-volatile and may include, for example, one or more DRAM devices, flash memory devices, SRAM devices, zero-capacitor RAM (ZRAM) devices, twin transistor RAM (TTRAM) devices, read-only memory (ROM) devices, ferroelectric RAM (Fe-RAM) devices, magnetoresistive RAM (MRAM) devices, phase change memory RAM (PRAM) devices, or other types of RAM devices.

One or more processors 602 may include a virtual machine (VM) 605 for executing the instructions loaded in the memory 604. A virtual machine 605 may be provided to handle a process running on multiple processors so that the process may appear to be using only one computing resource rather than multiple computing resources. Virtualization may be employed in the electronic device 600 so that infrastructure and resources in the electronic device may be shared dynamically. Multiple VMs 605 may be resident on a single processor 602.

A hardware accelerator 606, may be implemented in an ASIC, FPGA, or some other device. The hardware accelerator 606 may be used to speed up the general processing rate of the electronic device 600.

The electronic device 600 may include a network interface 608 to interface to a Local Area Network (LAN), Wide Area Network (WAN) or the Internet through a variety of connections including, but not limited to, standard telephone lines, LAN or WAN links (e.g., T1, T3, 56 kb, X.25), broadband connections (e.g., integrated services digital network (ISDN), Frame Relay, asynchronous transfer mode (ATM), wireless connections (e.g., 802.11), high-speed interconnects (e.g., InfiniBand, gigabit Ethernet, Myrinet) or some combination of any or all of the above. The network interface 708 may include a built-in network adapter, network interface card, personal computer memory card international association (PCMCIA) network card, card bus network adapter, wireless network adapter, universal serial bus (USB) network adapter, modem or any other device suitable for interfacing the electronic device 600 to any type of network capable of communication and performing the operations described herein.

The electronic device 600 may include one or more input devices 610, such as a keyboard, a multi-point touch interface, a pointing device (e.g., a mouse), a gyroscope, an accelerometer, a haptic device, a tactile device, a neural device, a microphone, or a camera, that may be used to receive input from, for example, a user. Note that electronic device 600 may include other suitable I/O peripherals.

The input devices 610 may be allow a user to provide input that is registered on a visual display device 614. A graphical user interface (GUI) 616 may be shown on the display device 614.

A storage device 618 may also be associated with the computer 600. The storage device 618 may be accessible to the processor 602 via an I/O bus. The information may be executed, interpreted, manipulated, and/or otherwise processed by the processor 602. The storage device 618 may include, for example, a storage device, such as a magnetic disk, optical disk (e.g., CD-ROM, DVD player), random-access memory (RAM) disk, tape unit, and/or flash drive. The information may be stored on one or more non-transient tangible computer-readable media contained in the storage device. This media may include, for example, magnetic discs, optical discs, magnetic tape, and/or memory devices (e.g., flash memory devices, static RAM (SRAM) devices, dynamic RAM (DRAM) devices, or other memory devices). The information may include data and/or computer-executable instructions that may implement one or more embodiments of the invention The storage device 618 may be useful for storing application software programs, such as a programming/block diagramming environment 620 (which may be, for example the MATLAB® environment or the Simulink® environment), source code 622 (such as a high level language representation), applications 624 and an operating system (OS) 626. The applications 622 may include, for example, a compiler 510, a linker 540, one or more executable files 550, and an execution environment 560.

The electronic device 600 can be running an operating system (OS) 626. Examples of OS 626 may include the Microsoft® Windows® operating systems, the Unix and Linux operating systems, the MacOS® for Macintosh computers, an embedded operating system, such as the Symbian OS, a real-time operating system, an open source operating system, a proprietary operating system, operating systems for mobile electronic devices, or other operating system capable of running on the electronic device and performing the operations described herein. The operating system may be running in native mode or emulated mode.

One or more embodiments of the invention may be implemented using computer-executable instructions and/or data that may be embodied on one or more non-transitory tangible computer-readable mediums. The mediums may be, but are not limited to, a hard disk, a compact disc, a digital versatile disc, a flash memory card, a Programmable Read Only Memory (PROM), a Random Access Memory (RAM), a Read Only Memory (ROM), Magnetoresistive Random Access Memory (MRAM), a magnetic tape, or other computer-readable media.

One or more embodiments of the invention may be implemented in a programming language. Some examples of languages that may be used include, but are not limited to, Python, C, C++, C#, SystemC, Java, Javascript, a hardware description language (HDL), unified modeling language (UML), and Programmable Logic Controller (PLC) languages. Further, one or more embodiments of the invention may be implemented in a hardware description language or other language that may allow prescribing computation. One or more embodiments of the invention may be stored on or in one or more mediums as object code. Instructions that may implement one or more embodiments of the invention may be executed by one or more processors. Portions of the invention may be in instructions that execute on one or more hardware components other than a processor.

Figure 7:
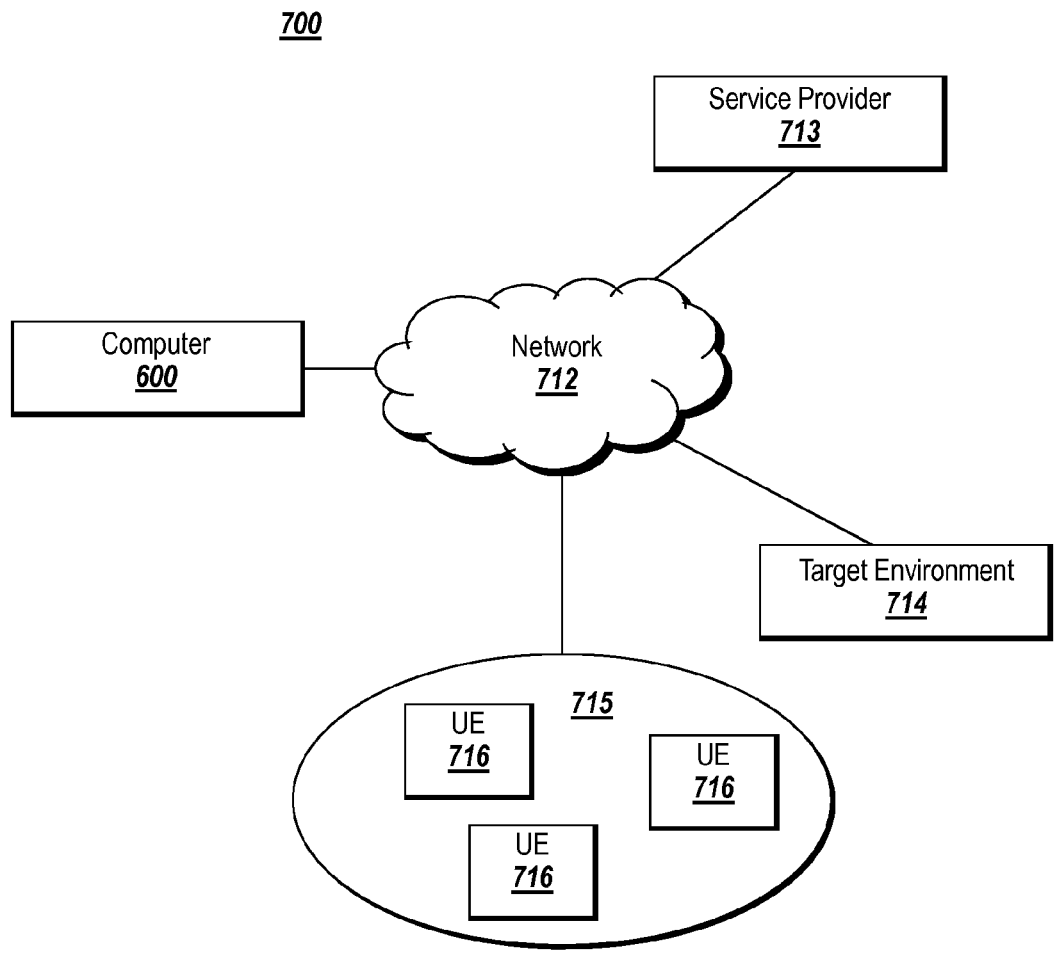
FIG. 7 illustrates an example of a communications network that may be used with one or more embodiments described herein.

FIG. 7 depicts a network implementation that may implement one or more embodiments of the invention. A system 700 may include an electronic device 600, a network 712, a service provider 713, a target environment 714, and a cluster 715. The embodiment of FIG. 7 is exemplary, and other embodiments can include more devices, fewer devices, or devices in arrangements that differ from the arrangement of FIG. 7.

The network 712 may transport data from a source to a destination. Embodiments of the network 712 may use network devices, such as routers, switches, firewalls, and/or servers (not shown) and connections (e.g., links) to transport data. 'Data,' as used herein, may refer to any type of machine-readable information having substantially any format that may be adapted for use in one or more networks and/or with one or more devices (e.g., the electronic device 600, the service provider 713, etc.). Data may include digital information or analog information. Data may further be packetized and/or non-packetized.

The network 712 may be a hardwired network using wired conductors and/or optical fibers and/or may be a wireless network using free-space optical, radio frequency (RF), and/or acoustic transmission paths. In one implementation, the network 712 may be a substantially open public network, such as the Internet. In another implementation, the network 712 may be a more restricted network, such as a corporate virtual network. The network 712 may include Internet, intranet, Local Area Network (LAN), Wide Area Network (WAN), Metropolitan Area Network (MAN), wireless network (e.g., using IEEE 802.11), or other type of network The network 712 may use middleware, such as Common Object Request Broker Architecture (CORBA) or Distributed Component Object Model (DCOM). Implementations of networks and/or devices operating on networks described herein are not limited to, for example, any particular data type, protocol, and/or architecture/configuration.

The service provider 713 may include a device that makes a service available to another device. For example, the service provider 713 may include an entity (e.g., an individual, a corporation, an educational institution, a government agency, etc.) that provides one or more services to a destination using a server and/or other devices. Services may include instructions that are executed by a destination to perform an operation (e.g., an optimization operation). Alternatively, a service may include instructions that are executed on behalf of a destination to perform an operation on the destination's behalf.

The target environment 714 may include a device that receives information over the network 712. For example, the target environment 714 may be a device that receives user input from the computer 600.

The cluster 715 may include a number of units of execution (UEs) 716 and may perform processing on behalf of the computer 600 and/or another device, such as the service provider 713. For example, the cluster 715 may perform parallel processing on an operation received from the computer 600. The cluster 715 may include UEs 716 that reside on a single device or chip or that reside on a number of devices or chips.

The units of execution (UEs) 716 may include processing devices that perform operations on behalf of a device, such as a requesting device. A UE may be a microprocessor, field programmable gate array (FPGA), and/or another type of processing device. UE 716 may include code, such as code for an operating environment. For example, a UE may run a portion of an operating environment that pertains to parallel processing activities. The service provider 713 may operate the cluster 715 and may provide interactive optimization capabilities to the computer 600 on a subscription basis (e.g., via a web service).

Units of Execution (UEs) may provide remote/distributed processing capabilities for products such as MATLAB® from The MathWorks, Inc. A hardware unit of execution may include a device (e.g., a hardware resource) that may perform and/or participate in parallel programming activities. For example, a hardware unit of execution may perform and/or participate in parallel programming activities in response to a request and/or a task it has received (e.g., received directly or via a proxy). A hardware unit of execution may perform and/or participate in substantially any type of parallel programming (e.g., task, data, stream processing, etc.) using one or more devices. For example, a hardware unit of execution may include a single processing device that includes multiple cores or a number of processors. A hardware unit of execution may also be a programmable device, such as a field programmable gate array (FPGA), an application specific integrated circuit (ASIC), a digital signal processor (DSP), or other programmable device. Devices used in a hardware unit of execution may be arranged in many different configurations (or topologies), such as a grid, ring, star, or other configuration. A hardware unit of execution may support one or more threads (or processes) when performing processing operations.

A software unit of execution may include a software resource (e.g., a technical computing environment) that may perform and/or participate in one or more parallel programming activities. A software unit of execution may perform and/or participate in one or more parallel programming activities in response to a receipt of a program and/or one or more portions of the program. A software unit of execution may perform and/or participate in different types of parallel programming using one or more hardware units of execution. A software unit of execution may support one or more threads and/or processes when performing processing operations.

The term 'parallel programming' may be understood to include multiple types of parallel programming, e.g. task parallel programming, data parallel programming, and stream parallel programming. Parallel programming may include various types of processing that may be distributed across multiple resources (e.g., software units of execution, hardware units of execution, processors, microprocessors, clusters, labs) and may be performed at the same time.

For example, parallel programming may include task parallel programming where a number of tasks may be processed at the same time on a number of software units of execution. In task parallel programming, a task may be processed independently of other tasks executing, for example, at the same time.

Parallel programming may include data parallel programming, where data (e.g., a data set) may be parsed into a number of portions that may be executed in parallel using, for example, software units of execution. In data parallel programming, the software units of execution and/or the data portions may communicate with each other as processing progresses.

Parallel programming may include stream parallel programming (sometimes referred to as pipeline parallel programming). Stream parallel programming may use a number of software units of execution arranged, for example, in series (e.g., a line) where a first software unit of execution may produce a first result that may be fed to a second software unit of execution that may produce a second result given the first result. Stream parallel programming may also include a state where task allocation may be expressed in a directed acyclic graph (DAG) or a cyclic graph.

Other parallel programming techniques may involve some combination of task, data, and/or stream parallel programming techniques alone or with other types of processing techniques to form hybrid-parallel programming techniques.

The foregoing description may provide illustration and description of various embodiments of the invention, but is not intended to be exhaustive or to limit the invention to the precise form disclosed. Modifications and variations may be possible in light of the above teachings or may be acquired from practice of the invention. For example, while a series of acts has been described above, the order of the acts may be modified in other implementations consistent with the principles of the invention. Further, non-dependent acts may be performed in parallel. Further, although features and accessing classes have been described above using particular syntaxes, features and accessing classes may equally be specified using in different ways and using different syntaxes.

In addition, one or more implementations consistent with principles of the invention may be implemented using one or more devices and/or configurations other than those illustrated in the Figures and described in the Specification without departing from the spirit of the invention. One or more devices and/or components may be added and/or removed from the implementations of the figures depending on specific deployments and/or applications. Also, one or more disclosed implementations may not be limited to a specific combination of hardware.

Furthermore, certain portions of the invention may be implemented as logic that may perform one or more functions. This logic may include hardware, such as hardwired logic, an application-specific integrated circuit, a field programmable gate array, a microprocessor, software, or a combination of hardware and software.

No element, act, or instruction used in the description of the invention should be construed critical or essential to the invention unless explicitly described as such. Also, as used herein, the article "a" is intended to include one or more items. Where only one item is intended, the term "a single" or similar language is used. Further, the phrase "based on," as used herein is intended to mean "based, at least in part, on" unless explicitly stated otherwise. In addition, the term "user", as used herein, is intended to be broadly interpreted to include, for example, an electronic device (e.g., a workstation) or a user of a electronic device, unless otherwise stated.

It is intended that the invention not be limited to the particular embodiments disclosed above, but that the invention will include any and all particular embodiments and equivalents falling within the scope of the following appended claims.

The invention claimed is:

1. A non-transitory electronic-device readable storage medium storing instructions, the instructions comprising:
one or more instructions that, when executed by a processor, cause the processor to:
accept a specification of an accessed class, the accessed class supporting a plurality of features that provide information or functionality on behalf of the accessed class, wherein the specification comprises:
an identification of a first feature from among the plurality of features, and
a list of function names to be granted access to the first feature;
receive a request to access the first feature by an accessing function of an accessing class, determine whether a name of the accessing function is in the list of function names to be granted access to the first feature,
  allow the accessing function to access the first feature if the name of the accessing function is in the list of function names to be granted access to the first feature,
  specify a name of one or more accessing classes in conjunction with the list of the function names when the accessing function is allowed to access the first feature, and
  prevent the accessing function from accessing the first feature at compile time if the name of the accessing function is not in the list of function names to be granted access to the first feature; and
restrict functions whose function names are not specified in the specification from accessing the first feature of the accessed class.

2. The medium of claim 1, wherein the first feature and the list of function names are specified as part of a class definition for the accessed class in the specification.

3. The medium of claim 1, wherein the preventing is enforced at run time.

4. The medium of claim 1, wherein the first feature is a property of the accessed class.

5. The medium of claim 1, wherein the first feature is a class function of the accessed class.

6. The medium of claim 1, wherein the first feature is an event triggered by the accessed class.

7. The medium of claim 1, wherein the first feature causes a listener to be attached to an event, the event defined by the accessed class.

8. The medium of claim 1, wherein the first feature is invoking a delegate defined by the accessed class.

9. The medium of claim 1, wherein the first feature is defining a subclass of the accessed class.

10. The medium of claim 1, wherein the accessing function is invoked by a block of a block diagram model.

11. The medium of claim 1, wherein the processor is further configured to:
  specify a name of one or more accessing classes in conjunction with the list of the function names, wherein functions belonging to one of the specified accessing classes are permitted to access the first feature.

12. A computer-implemented method comprising:
  accepting a specification of a first set of features of an accessed class,
    the first set of features accessed by an accessing class, and
    the specification of the first set of features comprising:
      an identity of one or more protected features in the first set of features, and
      an identity of the accessing class to be granted access to one or more of the first set of features of the accessed class; and
  enforcing access rights to the first set of features, the enforcing comprising:
    receiving a request to access a requested feature of the accessed class by a calling a function of the accessing class,
    determining whether the requested feature is in the first set of features or a second set of features,
    allowing the specified accessing class to access the requested feature if the requested feature is determined to be in the first set of features of the accessed class and if the calling function is granted access to the requested feature in the specification of the first set of features,
    wherein allowing the calling function access to the requested feature comprises specifying a name of the calling function in the specification, and
    preventing the specified accessing class from accessing the requested feature at compile time if the calling function is not granted access to the requested feature in the specification of the first set of features; and
  restricting functions whose function names are not specified in the specification from accessing the requested feature of the accessed class.

13. A system comprising:
  a non-transitory storage medium storing:
    a specification of an accessed class, the accessed class supporting a plurality of features that provide information or functionality on behalf of the accessed class, wherein the specification comprises:
      an identification of a first feature from among the plurality of features, and
      a list of function names to be granted access to the first feature; and
  a processor programmed with instructions that, when executed, cause the processor to:
    receive a request to access the first feature by an accessing function of an accessing class,
    determine whether a name of the accessing function is in the list of function names to be granted access to the first feature,
      allow the accessing function to access the first feature at compile time if the name of the accessing function is in the list of function names to be granted access to the first feature,
      wherein allowing the accessing function access to the first feature comprises specifying a name of the calling function in the specification; and
      prevent the accessing function from accessing the first feature if the name of the accessing function is not in the list of function names to be granted access to the first feature;
    restrict functions whose function names are not specified in the specification from accessing the first feature of the accessed class.

* * * * *